(12) United States Patent
Rittler et al.

(10) Patent No.: US 11,719,317 B2
(45) Date of Patent: Aug. 8, 2023

(54) ELECTRIC VEHICLE TRANSMISSION

(71) Applicant: ZF Friedrichshafen AG, Friedrichshafen (DE)

(72) Inventors: David Rittler, Neukirch (DE); Stefan Renner, Bodman-Ludwigshafen (DE); Stefan Spühler, Friedrichshafen (DE); Johannes Glückler, Friedrichshafen (DE); Michael Trübenbach, Friedrichshafen (DE); Paul Lenz, Waldkirchen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/047,103

(22) Filed: Oct. 17, 2022

(65) Prior Publication Data
US 2023/0139069 A1 May 4, 2023

(30) Foreign Application Priority Data
Oct. 28, 2021 (DE) ...................... 10 2021 212 164.0

(51) Int. Cl.
*F16H 37/08* (2006.01)
*F16H 61/00* (2006.01)
(Continued)

(52) U.S. Cl.
CPC .............. *F16H 37/082* (2013.01); *B60K 1/00* (2013.01); *B60K 17/08* (2013.01);
(Continued)

(58) Field of Classification Search
CPC .... B60K 1/00; B60K 17/08; B60K 2001/001; B60K 2007/0061; F16D 2023/0625;
(Continued)

(56) References Cited

U.S. PATENT DOCUMENTS 10,544,854 B2      1/2020  Schilder et al.
2009/0143185 A1*   6/2009  Hiramatsu ................ F16H 3/66
                                                         475/275

(Continued)

FOREIGN PATENT DOCUMENTS

DE   10 2016 003 575 A1   9/2017
DE   10 2017 006 262 A1   1/2019
WO      2019/007723 A1    1/2019

OTHER PUBLICATIONS

German Patent Office, Search Report issued in German patent application No. 10 2021 212 164.0 (dated Jun. 2, 2022).

*Primary Examiner* — Timothy Hannon
*Assistant Examiner* — Farhana Pervin
(74) *Attorney, Agent, or Firm* — Finch & Maloney, PLLC

(57) ABSTRACT

An electric vehicle transmission (7) has a drive input shaft (10), a drive output shaft (11), a first planetary gearset (P1), a second planetary gearset (P2), and a third planetary gearset (P3). The drive input shaft (10) is designed to be coupled to an electric machine (6). In addition, at least functionally a first shifting element (A), a second shifting element (B), a third shifting element (C), and a fourth shifting element (D) are provided. Also disclosed is a drive system (4), a vehicle drive-train (5), and an electric vehicle incorporating an electric vehicle transmission of this type.

18 Claims, 7 Drawing Sheets

(51) Int. Cl.
*B60K 17/08* (2006.01)
*B60K 1/00* (2006.01)

(52) U.S. Cl.
CPC .... *F16H 61/0059* (2013.01); *B60K 2001/001* (2013.01); *F16H 2200/0021* (2013.01); *F16H 2200/0039* (2013.01); *F16H 2200/201* (2013.01); *F16H 2200/2094* (2013.01)

(58) Field of Classification Search
CPC ..... F16D 2023/0631; F16D 2023/0687; F16D 2023/0693; F16H 2200/0021; F16H 2200/0039; F16H 2200/201; F16H 2200/2038; F16H 37/082; F16H 2003/442; F16H 3/62; F16H 2200/2035
See application file for complete search history.

(56) References Cited

U.S. PATENT DOCUMENTS

| | | | |
|---|---|---|---|
| 2017/0036527 A1* | 2/2017 | Hwang | B60K 6/442 |
| 2019/0344660 A1* | 11/2019 | Kumar | B60K 7/0007 |
| 2020/0262293 A1* | 8/2020 | Glückler | B60K 17/06 |
| 2020/0282827 A1* | 9/2020 | Kaltenbach | B60K 17/06 |

* cited by examiner

|    | A | B | C | D |
|----|---|---|---|---|
| G1 | x |   | x |   |
| G2 | x |   |   | x |
| G3 |   | x |   | x |

Fig. 5

ELECTRIC VEHICLE TRANSMISSION

RELATED APPLICATIONS

This application claims the benefit of and right of priority under 35 U.S.C. § 119 to German Patent Application no. 10 2021 212 164.0, filed on 28 Oct. 2021, the contents of which are incorporated herein by reference in its entirety.

FIELD OF THE DISCLOSURE

The invention relates to an electric vehicle transmission, comprising a drive input shaft, a drive output shaft, and a first planetary gearset, a second planetary gearset and a third planetary gearset, wherein the drive input shaft is designed to be coupled to an electric machine, wherein the first planetary gearset, the second planetary gearset and the third planetary gearset comprise in each case a first element, a second element, and a third element in the form, respectively, of a sun gear, a planetary web, and a ring gear, wherein a first shifting element, a second shifting element, and a third shifting element are provided at least for functional purposes, and wherein the first element of the first planetary gearset is connected rotationally fixed to the drive input shaft. In addition, the invention relates to a drive system, a vehicle drive-train, and an electric vehicle.

BACKGROUND

In electric vehicles, an electric vehicle transmission is usually provided in the drive-train concerned between an electric machine and drive wheels of the electric vehicle, in order to gear up or down a drive input movement of the electric machine relative to the drive wheels, particularly into the slow range. Besides single-gear electric vehicle transmissions, transmissions are also used for electric utility vehicles in which two or more gears can be engaged.

DE 10 2017 006 262 A1 describes an electric vehicle transmission which is designed for use in an electric vehicle. In that case, besides a drive input shaft and a drive output shaft, the electric vehicle transmission comprises three planetary gearsets, each of which consists of elements in the form of a sun gear, a planetary web, and a ring gear. In the installed condition of the electric vehicle transmission the drive input shaft serves for connection to an upstream electric machine. In addition, the electric vehicle transmission comprises three shifting elements in the form of frictional shifting elements, by the selective actuation of which a power flow can be established with different gear ratios from the drive input shaft, via the planetary gearsets, to the drive output shaft.

SUMMARY

Starting from the above-described prior art the purpose of the present invention is to provide a compact electric vehicle transmission with which various gears for connecting an electric machine can advantageously be obtained.

This objective is achieved in combination with an electric vehicle transmission and the characterizing features disclosed herein, from which advantageous further developments of the invention will be apparent. The present disclosure also relates to a drive system comprising an electric vehicle transmission, a vehicle drive-train, and an electric vehicle with a vehicle drive-train of that type.

According to the invention, an electric vehicle transmission comprises a drive input shaft, a drive output shaft, and a first planetary gearset, a second planetary gearset and a third planetary gearset, wherein the drive input shaft is designed to be coupled to an electric machine. The first planetary gearset, the second planetary gearset, and the third planetary gearset comprise in each case a first element, a second element, and a third element, in the form, respectively, of a sun gear, a planetary web, and a ring gear. Furthermore, at least for functional purposes a first shifting element, a second shifting element and a third shifting element are provided. The first element of the first planetary gearset is connected rotationally fixed to the drive input shaft.

In the context of the invention a "shaft" is understood to mean a rotatable component of the transmission by way of which a power flow can be established between components, if necessary, with simultaneous actuation of a corresponding shifting element. The shaft concerned can connect components to one another axially, or radially, or even both axially and radially. Thus, the shaft concerned can also act as an intermediate element by means of which a respective component can be connected, for example radially.

In the context of the invention "axial" means an orientation in the direction of a longitudinal central axis of the transmission, parallel to which the rotation axes of rotatable components of the transmission, in particular the shafts of the transmission and the elements of the planetary gearsets, are arranged. "Radial" is then understood to be any orientation in the diameter direction of any component of the transmission.

In the electric vehicle transmission according to the invention the drive input shaft is provided for forming a coupling on the drive input side to an electric machine. For that purpose the drive input shaft is in particular provided with a connection point at which the drive input shaft can be coupled to a rotor of the electric machine. This coupling between the electric machine and the drive input shaft is of such form that when the electric vehicle transmission is in its installed condition, there is always a fixed rotation speed ratio between the rotation speed of the drive input shaft and the rotation speed of the rotor of the electric machine. Thus, in the context of the invention if necessary at least one further gear ratio stage such as a spur gear stage and/or a planetary stage can be provided between the drive input shaft and the rotor of the electric machine, by means of which a preliminary gear ratio of a rotation movement of the rotor of the electric machine relative to the drive input shaft can be obtained. Particularly preferably, however, the drive input shaft of the electric vehicle transmission according to the invention is connected rotationally fixed to the rotor of the electric machine so that during operation the rotor and the drive input shaft run at the same rotation speed.

In the electric vehicle transmission according to the invention, the drive input shaft and the drive output shaft are arranged in particular coaxially with one another, and it is further preferred that the planetary gearsets too are positioned coaxially with the drive input shaft and the drive output shaft. In that way the structure of the electric vehicle transmission can be made particularly compact in the radial direction.

The planetary gearsets consist in each case of a first element, a second element, and a third element, wherein the elements of each planetary gearset consist of a sun gear, a planetary web, and a ring gear. Particularly preferably the individual planetary gearsets are 'minus' planetary gearsets, in which the planetary web concerned supports at least one planetary gearwheel rotatably, the at least one planetary gearwheel meshing both with the associated sun gear and with the associated ring gear. In a design of the planetary gearsets as 'minus' planetary gearsets, then in particular the first element is the sun gear, the second element is the planetary web, and the third element is the ring gear.

Alternatively, in principle, one or more of the planetary gearsets could be in the form of a 'plus' planetary gearset. In that case the planetary web concerned supports at least one planetary gearwheel pair rotatably, of which one of the planetary gearwheels meshes with the associated sun gear and one with the associated ring gear. Moreover, the planetary gearwheels of the at least one planetary gearwheel pair mesh with one another. Otherwise than with a 'minus' planetary gearset design, the first element of the planetary gearset concerned is then preferably the sun gear, the second element of the planetary gearset concerned is the ring gear, and the third element of the planetary gearset concerned is the planetary web. Compared with the 'minus' planetary gearset design, a stationary transmission ratio of the planetary gearset concerned must be increased by one. As already described above, however, in the context of the invention all the planetary gearsets are preferably 'minus' planetary gearsets. Also preferably, in the electric vehicle transmission according to the invention exactly three planetary gearsets are provided.

The electric vehicle transmission according to the invention also comprises a number of shifting elements, by the selective actuation of which preferably different gears between the drive input shaft and the drive output shaft can be obtained. In each of the gears a power flow passes from the drive input shaft by way of the planetary gearsets to the drive output shaft. Particularly preferably, between the drive input shaft and the drive output shaft exactly three gears with different gear ratios can be obtained.

That a particular shifting element is provided "at least for functional purposes" means in the context of the invention that in the electric vehicle transmission according to the invention, at least the respective function of the shifting element concerned is available. The shifting elements can actually be present as individual shifting elements, or their function is brought about by some other component, as for example a shifting device which combines the function of two or more shifting elements.

The invention is now based on the technical principle that the second element of the first planetary gearset and the first element of the third planetary gearset are connected to one another in a rotationally fixed manner. Furthermore, the third element of the first planetary gearset and the first element of the second planetary gearset are connected rotationally fixed to one another, while the third element of the third planetary gearset is immobilized. In addition, the second element of the third planetary gearset is connected rotationally fixed to the drive output shaft, whereas the second element of the second planetary gearset can be immobilized by the first shifting element. Two of the elements of the second planetary gearset can be connected rotationally fixed to one another by means of the second shifting element, which results in blocking of the second planetary gearset. The third element of the second planetary gearset can be connected rotationally fixed to the second element of the first planetary gearset and the first element of the third planetary gearset by means of the third shifting element, and the third element of the second planetary gearset can also be connected rotationally fixed to the drive output shaft by means of a fourth shifting element which is present at least functionally.

In the electric vehicle transmission according to the invention the first element of the first planetary gearset is permanently connected to the drive input shaft in a rotationally fixed manner, so that the drive input shaft and the first element of the first planetary gearset always rotate at the same speed. Furthermore, the second element of the first planetary gearset and the first element of the third planetary gearset are permanently connected rotationally fixed to one another, so that the second element of the first planetary gearset and the first element of the third planetary gearset always rotate at the same speed. Likewise, the third element of the first planetary gearset and the first element of the second planetary gearset are permanently connected rotationally fixed to one another, so that the third element of the first planetary gearset and the first element of the second planetary gearset always rotate at the same speed. Moreover, the third element of the third planetary gearset is permanently immobilized and thereby prevented from any rotational movement. The second element of the third planetary gearset is permanently connected rotationally fixed to the drive output shaft, so that the second element of the third planetary gearset and the drive output shaft always rotate at the same speed.

In the context of the invention the individual rotationally fixed connections are preferably in each case formed by a respective intermediate shaft, which for this can be made in one or more pieces. Furthermore, in the context of the invention a design can also be considered, in which the respective shaft is integral with one, or even with both of the components connected rotationally fixed with it, the latter case in particular being realized when the transmission components permanently connected to one another are spatially arranged closely adjacent to one another.

Closing of the first shifting element results in a fixing of the second element of the second planetary gearset, so that it is consequently prevented from rotating. On the other hand, if the second shifting element is changed to a closed condition, then two of the elements of the second planetary gearset are connected rotationally fixed to one another and this correspondingly leads to blocking of the second planetary gearset. In its closed condition the third shifting element connects in a rotationally fixed manner the third element of the second planetary gearset to the second element of the first planetary gearset and the first element of the third planetary gearset, so that consequently the third element of the second planetary gearset, the second element of the first planetary gearset, and the first element of the third planetary gearset rotate at the same speed. On the other hand, actuation of the fourth shifting element results in a rotationally fixed connection of the third element of the second planetary gearset to the drive output shaft and thus also to the second element of the third planetary gearset, and thereby brings about an equal rotation speed of the drive output shaft, the second element of the third planetary gearset, and the third element of the second planetary gearset.

The permanently fixed condition of the third element of the third planetary gearset and the fixing of the second element of the second planetary gearset by means of the first shifting element take place, respectively, in particular since the elements concerned are connected rotationally fixed to a permanently fixed structural element or will be connected rotationally fixed thereto. The said permanently fixed structural element is preferably a transmission housing of the electric vehicle transmission, part of the transmission housing, or a component rotationally fixed thereto. The third element of the third planetary gearset can in this case even be made integrally with the permanently fixed structural element.

When actuated, the second shifting element forms a rotationally fixed connection between two elements of the second planetary gearset, such that in the context of the invention the second shifting element can connect the first element and the second element of the second planetary gearset, or the first element and the third element of the second planetary gearset, or the second element and the third element of the second planetary gearset rotationally fixed to one another. In all three of the said variants the second planetary gearset is blocked. Preferably however, actuation of the second shifting element forms a rotationally fixed connection between the second element and the first element or the second element and the third element. Particularly preferably, actuation of the second shifting element forms a rotationally fixed connection between the first element of the second planetary gearset and the second element of the second planetary gearset.

The design of an electric vehicle transmission in accordance with the invention has the advantage that by means of the shifting elements, a number of different gears between the drive input shaft and the drive output shaft can be engaged, so that in the installed condition of the electric vehicle transmission, a conversion of a drive movement of an electric machine with different gear ratios is possible. Thanks to the configuration of the electric vehicle transmission according to the invention, this can be achieved with a compact structure.

With the electric vehicle transmission according to the invention a first gear is obtained between the drive input shaft and the drive output shaft by closing the first shifting element and the third shifting element, while in contrast a second gear between the drive input shaft and the drive output shaft can be engaged by actuating the first shifting element and the fourth shifting element. In addition, a third gear between the drive input shaft and the drive output shaft can be engaged by closing the second shifting element and the fourth shifting element. Advantageously, in this way a suitable range of gears of the electric vehicle transmission is realized in the form of a corresponding power flow by way of the three planetary gearsets. In this way, sequential engagement between the gears can be realized by switching between two shifting elements. Thus, for a change from the first gear to the second gear in the closed condition of the first shifting element, the third shifting element has to be opened and the fourth shifting element actuated thereafter, whereas for a gearshift from the second gear to the third gear, with the fourth shifting element closed, the first shifting element has to be opened and the second shifting element closed thereafter.

In an embodiment of the invention, the function of a parking lock is obtained in the electric vehicle transmission according to the invention by the simultaneous actuation of the first shifting element and the second shifting element. This is because the second element of the second planetary gearset is thereby immobilized and at the same time the second planetary gearset is blocked, which also results in the blocking of the electric vehicle transmission as a whole. In the installed condition of the electric vehicle transmission according to the invention, a parking lock of the electric vehicle can be realized in that way.

In the context of the invention a parking lock function can also be produced by actuating the third shifting element and the fourth shifting element at the same time. This results in a rotationally fixed connection between the drive output shaft, and therefore also the second element of the third planetary gearset, and the first element of the third planetary gearset indirectly via the third element of the second planetary gearset, and thereby blocks the third planetary gearset. Since the third element of the third planetary gearset is permanently immobilized, this also leads to the fixing of the complete third planetary gearset and thus also the electric vehicle transmission as a whole. When the electric vehicle transmission is used in an electric vehicle, in that way too a parking lock can be produced.

Preferably, the shifting elements are in the form of interlocking shifting elements and particularly preferably they are unsynchronized claw-type shifting elements. A design of the shifting elements as interlocking shifting elements has the advantage that in an open condition of a respective shifting element no drag losses or only very slight drag losses occur at the said shifting element. This improves the efficiency of the electric vehicle transmission. Alternatively, however, one or more of the shifting elements can also be in the form of interlocking shifting elements of the locking synchronization type. As a further alternative, one or more of the shifting elements can be in the form of frictional shifting elements, particularly preferably disk shifting elements. Advantageously, this enables the individual shifting element to be actuated under load.

In a further development of the above embodiment the first and second shifting elements are formed by a shifting device whose coupling element can be moved to a first shift position and a second shift position. In this case, in the first shift position the coupling element functionally brings about an actuated condition of the first shifting element and fixes the second element of the second planetary gearset. In the second shift position the coupling element functionally brings about an actuated condition of the second shifting element and connects the second element of the second planetary gearset rotationally fixed to the first element or to the third element of the second planetary gearset. The reproduction of the functions of the first shifting element and the second shifting element by a shifting device has the advantage that the respective rotationally fixed couplings can be realized in a compact manner and with a smaller number of components.

In this case, if the function of a parking lock can also be obtained, then the coupling element of the shifting device can additionally be moved to a third shift position in which the coupling element at the same time functionally brings about an actuated condition of the first shifting element and the second shifting element, since the second element of the second planetary gearset is fixed by the coupling element and is at the same time connected rotationally fixed to the first element or to the third element of the second planetary gearset. Advantageously, in that way the function of a simultaneous actuation of the first shifting element and the second shifting element can also be obtained, since in its third shift position the coupling element ensures both the fixing of the second element of the second planetary gearset and the blocking of the second planetary gearset.

Alternatively, or in addition to the above-mentioned variant, the third shifting element and the fourth shifting element are formed by a shifting device whose coupling element can be positioned in a first shift position and in a second shift position, wherein in its first shift section the coupling element functionally brings about an actuated condition of the third shifting element and connects the third element of the second planetary gearset rotationally fixed to the first element of the third planetary gearset and the second element of the first planetary gearset. Furthermore, in its second shift position the coupling element functionally brings about an actuated condition of the fourth shifting element and brings the third element of the second planetary gearset into rotationally fixed connection with the drive output shaft. By providing a shifting device for reproducing the functions of the third and fourth shifting elements, a compact structure can be achieved and in addition the number of components of the electric vehicle transmission can be reduced, which lowers the production costs.

When the functions of the third and fourth shifting elements are obtained by means of a shifting device, the function of a parking lock can again be obtained if the coupling element of the shifting device can also be moved to a third shift position in which the coupling element functionally brings about an actuated condition of the third shifting element and of the fourth shifting element at the same time, in that the third element of the second planetary gearset is connected rotationally fixed at the same time with the first element of the third planetary gearset and the second element of the first planetary gearset, and is also brought into rotationally fixed connection with the drive output shaft. In that way the third planetary gearset is blocked and hence, owing to the permanently fixed condition of the third element of the third planetary gearset, the whole of the third planetary gearset is also fixed.

In the context of the invention, in particular two shifting devices are provided, one of which brings about the function of the first and second shifting elements in the manner described above, whereas the function of the third and fourth shifting elements can be brought about by the other shifting device. Thus, in the electric vehicle transmission according to the invention preferably both shifting devices are provided, enabling a particularly compact structure to be produced. In this case, to obtain the function of a parking lock in the electric vehicle transmission it is sufficient for only one of the coupling elements of the shifting devices to be able to be moved to a respective third shift position in order to block the transmission.

Particularly preferably, each respective coupling element of the shifting devices is in the form of a type of shifting sleeve which in each case is guided on a guiding tooth array in a rotationally fixed and axially displaceable manner, wherein the said teeth are connected rotationally fixed to the element which, in the shifting device concerned, is to be connected rotationally fixed in the various shift positions of the associated coupling element. Furthermore, such a coupling element is in particular equipped with at least one set of meshing teeth with which the coupling element engages at the shift position concerned in respectively associated tooth arrays. The teeth are in each case connected rotationally fixed to the component or components of the electric vehicle transmission which, in the individual shift position, are to be connected rotationally fixed by the coupling element concerned with the element guiding the coupling element.

In accordance with a possible design of the invention, the drive output shaft is coupled to a differential gear system. This differential is in particular a transverse differential which, also preferably, is a bevel gear differential. By way of the transverse differential, preferably, a drive input movement transmitted to the drive output shaft of the electric vehicle transmission is distributed to drive output shafts of a drive axle of the electric vehicle. In particular the drive output shaft of the differential gear system is coupled to a differential cage of the differential, wherein this coupling can be brought about in that the drive output shaft is connected rotationally fixed to the differential cage, or supports a spur gear that meshes with a drive actuator gear of the differential cage. Furthermore, the differential gear system can also be a longitudinal differential by way of which drive power can be distributed to more than one drive axle.

In an embodiment of the invention the planetary gearsets are arranged at a connection point of the drive input shaft that serves for coupling the drive input shaft to the electric machine, in the sequence of first planetary gearset, second planetary gearset, and third planetary gearset. This makes possible a suitable structure of the electric vehicle transmission according to the invention. In the context of the invention, however, in the axial direction at the connection point of the drive input shaft a different arrangement of the planetary gearsets can also be adopted. In a further development of the above embodiment the first shifting element and the second shifting element are arranged axially between the first planetary gearset and the second planetary gearset, while the third shifting element and the fourth shifting element are positioned axially between the second planetary gearset and the third planetary gearset. If in this the first shifting element and the second shifting element are formed by a common shifting device, that shifting device is preferably provided axially between the first and second planetary gearsets. Likewise, a shifting device forming the third and fourth shifting elements is positioned between the second and third planetary gearsets.

An object of the invention is also a drive system for an electric vehicle in which, besides an electric machine, an electric vehicle transmission according to one or more of the above-described variants is provided. In this case a rotor of the electric machine is coupled to the drive input shaft of the electric vehicle transmission, this coupling in particular being in the form of a rotationally fixed connection between the rotor of the electric machine and a connection point of the drive input shaft. Alternatively, however, one or more gear ratios could be provided between the drive input shaft of the electric vehicle transmission and the rotor of the electric machine, which in that case could in particular be in the form of spur gear stages or planetary stages. In the context of the invention the electric machine can in particular be operated on the one hand as a generator and on the other hand as an electric motor.

In a further development of a drive system according to the invention, the first planetary gearset of the electric vehicle transmission is arranged axially overlapping and radially on the inside of the electric machine. In that way a nested structure of the drive system can be produced, which results in an axially compact configuration.

A drive system that corresponds to one or more of the above-mentioned variants is in particular part of a vehicle drive-train, in this case provided for an electric vehicle. Preferably, in this case the drive system is arranged parallel to a drive axle, wherein the drive output shaft of the electric vehicle transmission is coupled to drive output shafts of the drive axle. Advantageously, in that way a more compact structure of a drive axle with the drive system can be produced, wherein the coupling between the drive output shaft of the electric vehicle transmission and the drive output shafts of the drive axle is in particular formed by way of a differential gear system.

In the context of the invention such a vehicle drive-train is provided in an electric vehicle which, in particular, is an electric utility vehicle. The electric vehicle can in particular be an electrically driven transporter.

In the context of the invention, that two structural elements of the electric vehicle transmission are in a rotationally fixed manner "connected" or "coupled" or "in connection with one another" means that the two structural elements are permanently coupled so that they cannot rotate independently of one another. Accordingly between the said structural elements, which can be elements of the planetary gearsets and/or shafts and/or a rotationally fixed structural element of the transmission, no shifting element is provided, but rather, the corresponding structural elements are coupled to one another with a fixed rotation speed ratio.

In contrast, if a shifting element is at least functionally provided between two structural elements, then these structural elements are not permanently coupled with one another in a rotationally fixed manner, but rather, a rotationally fixed coupling is only produced by actuating the at least functionally interposed shifting element. In the context of the invention actuation of the shifting element concerned means that the shifting element is changed to a closed condition and that consequently the rotation movements of the structural elements directly coupled to it are equalized. If the shifting element concerned is in the form of an interlocking shifting element, the structural elements directly connected rotationally fixed to one another by the shifting element run at the same rotation speed, whereas in the case of a frictional shifting element rotation speed differences can exist between the structural elements even when the shifting element has been actuated. In the context of the invention this desired, or even undesired condition, is nevertheless still called a rotationally fixed connection of the respective structural elements by the shifting element.

The invention is not limited to the indicated combination of features defined in the principal claim or the claims that depend on it. There are additional options for combining individual features with one another, provided that they emerge from the claims, the following description of preferred embodiments of the invention, or directly from the drawings. References in the claims to the drawings by the use of indexes are not intended to restrict the scope of the claims.

BRIEF DESCRIPTION OF THE DRAWINGS

Advantageous embodiments of the invention, which will be explained in what follows, are illustrated in the drawings, which show:

FIG. 5: An example of a shifting scheme for the electric vehicle transmission used in the drive-train shown in FIGS. 2 to 4;

DETAILED DESCRIPTION

Figure 1:
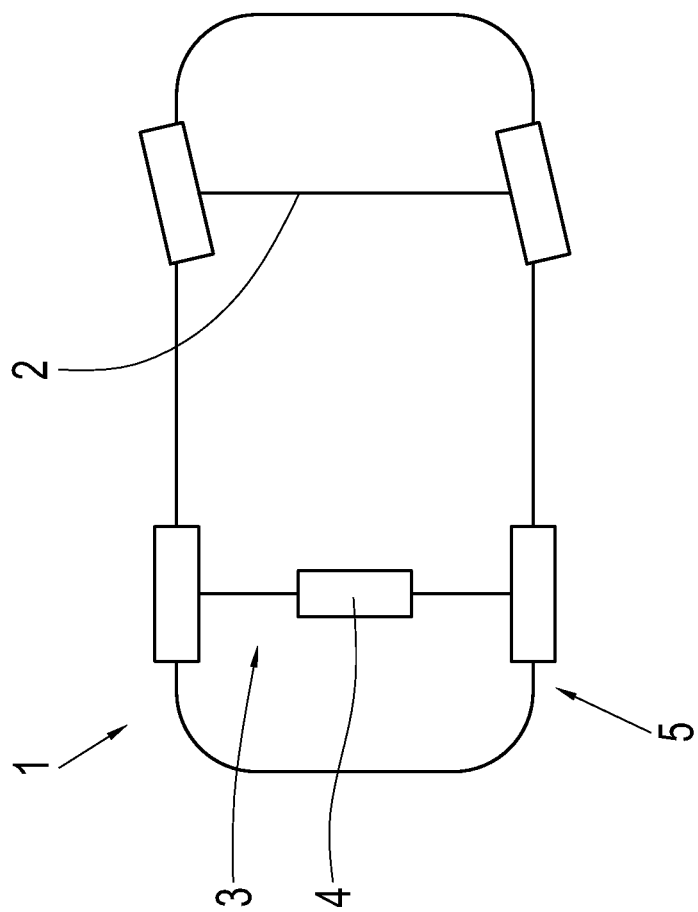
FIG. 1: A schematic representation of an electric vehicle, corresponding to a preferred embodiment of the invention.

FIG. 1 shows a schematic view of an electric vehicle 1, which is in particular an electric utility vehicle such as a transporter. Besides a steerable, non-driven axle 2, the electric vehicle 1 also comprises a driven axle 3 which, together with a drive system 4, is part of a vehicle drive-train 5. Whereas in this case the vehicle axle 2 is a front axle of the electric vehicle 1, the driven axle 3 is a rear axle of the electric vehicle 1. However, alternatively or in addition to the driven axle 3, the vehicle axle 2 could also be designed as a driven axle.

Figure 2:
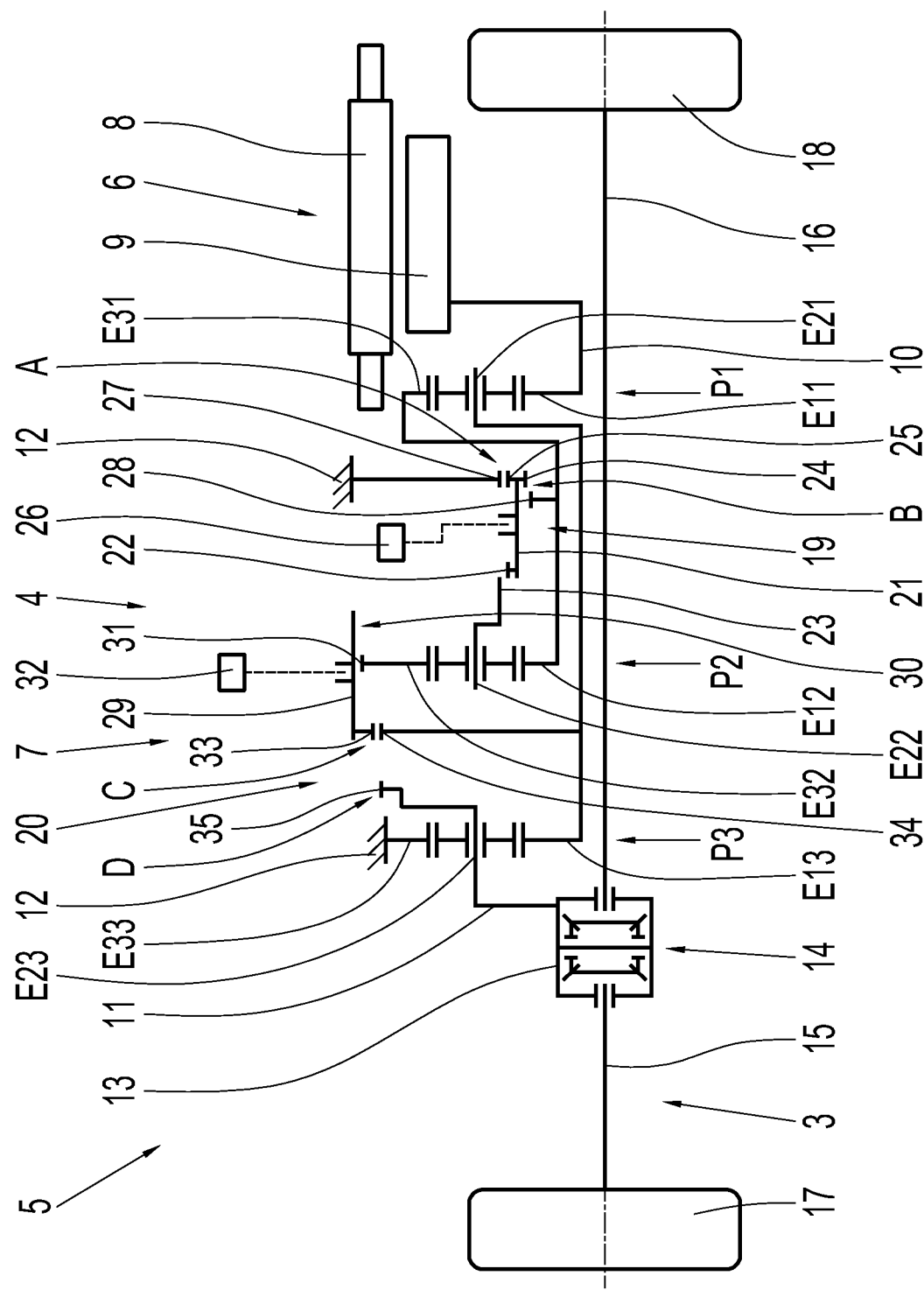
FIG. 2: A schematic view of a drive-train of the electric vehicle in FIG. 1, shown in a first shift condition of the electric vehicle transmission, corresponding to a first embodiment of the invention.
Figure 3:
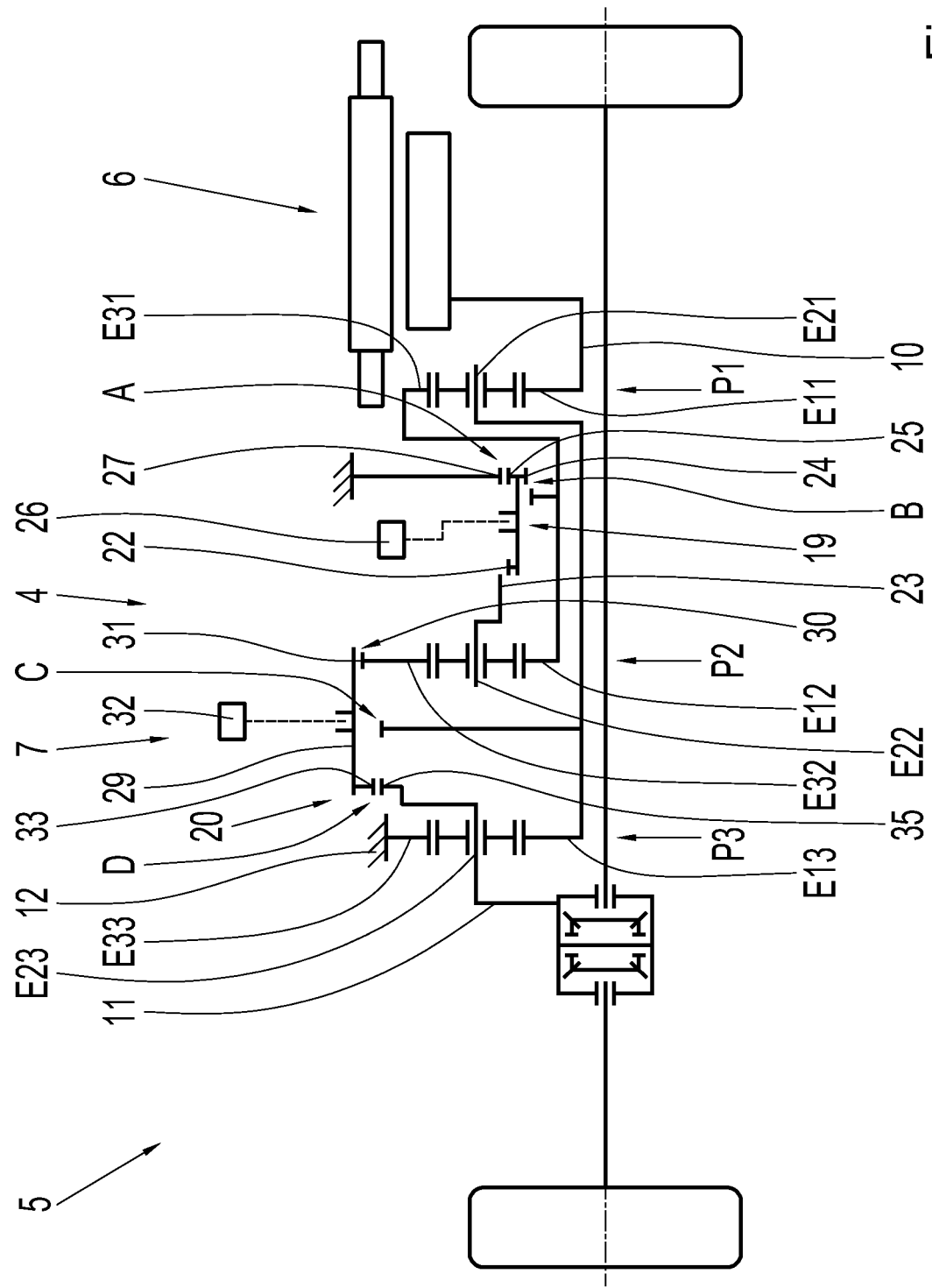
FIG. 3: A schematic representation of the drive-train in FIG. 2, shown in a second shift condition of an electric vehicle transmission.
Figure 4:
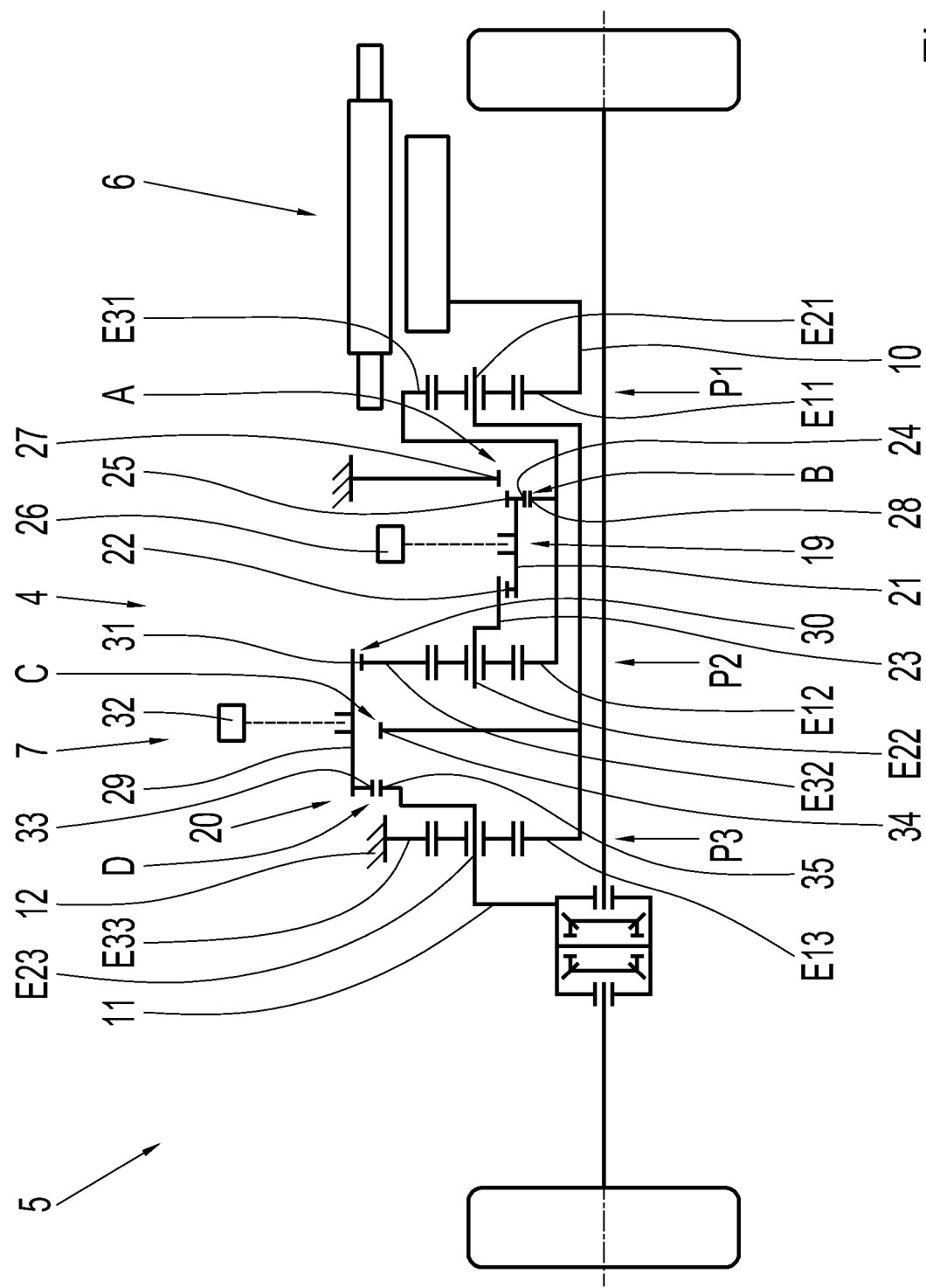
FIG. 4: A schematic representation of the drive-train in FIG. 2, shown in a third shift condition of an electric vehicle transmission.

In FIGS. 2 to 4 the vehicle drive-train 5 in the area of the driven axle 3 is now shown in greater detail, wherein the vehicle drive-train 5 is realized in accordance with a first design option of the invention. As can be seen here, the drive system 4 consists of an electric machine 6 and an electric vehicle transmission 7, which system is designed in accordance with a first embodiment of the invention. In a manner whose principle is known to those familiar with the subject, the electric machine 6 consists of a stator 8 and a rotor 9 such that the electric machine 6 can be operated on the one hand as a generator and on the other hand as an electric motor.

Besides a drive input shaft 10 and a drive output shaft 11 the electric vehicle transmission 7 comprises three planetary gearsets P1, P2, and P3, each of them consisting of a first element E11 or E12 or E13, a second element E21 or E22 or E23, and a third element E31 or E32 or E33, respectively. In this case, the respective first element E11 or E12 or E13 of the respective planetary gearset P1 or P2 or P3 is a sun gear in each case, while the respective second element E21 or E22 or E23 of the respective planetary gearset P1 or P2 or P3 is a planetary web. In addition, the respective third element E31 or E32 or E33 of the respective planetary gearset P1 or P2 or P3 is a ring gear of the planetary gearset P1 or P2 or P3 concerned.

On the respective planetary web of the planetary gearset P1 or P2 or P3 concerned, in each case at least one planetary gearwheel is mounted to rotate, which meshes both with the respective sun gear and with the respective ring gear of the planetary gearset P1 or P2 or P3. Thus, in this case the planetary gearsets P1, P2, and P3 are 'minus' planetary gearsets.

In the context of the invention, however, a design of one or more of the planetary gearsets P1 or P2 or P3 as 'plus' planetary gearsets can be considered, for which, compared with their respective designs as minus planetary gearsets, the second element E21 or E22 or E23 should be in the form of the respective ring gear and the respective third element E31 or E32 or E33 should be the respective planetary web. Moreover, if a respective planetary gearset is made as a plus planetary gearset, its stationary transmission ratio should be increased by one compared with a minus planetary gearset design. In a plus planetary gearset at least one planetary gearwheel pair is mounted to rotate on the planetary web concerned, of which planetary gearwheels one meshes with the sun gear and one meshes with the ring gear. Furthermore, the planetary gearwheels of the at least one planetary gearwheel pair mesh with one another.

In the present case the first element E11 of the first planetary gearset P1 is connected rotationally fixed to the drive input shaft 10, which in addition is in rotationally fixed connection with the rotor 9 of the electric machine 8. Accordingly, the first element E11 of the first planetary gearset P1 and the rotor 9 are connected rotationally fixed to one another by way of the drive input shaft 10, so that the first element E11 and the rotor 9 always rotate at the same speed. In the context of the invention the first element E11 of the first planetary gearset P1 can be made integrally with the drive input shaft 10.

The second element E12 of the first planetary gearset P1 is permanently connected rotationally fixed to the first element E13 of the third planetary gearset P3, so that these two elements E21 and E13 as well always rotate at the same speed. Likewise, the third element E31 of the first planetary gearset P1 and the first element E12 of the second planetary gearset P2 are permanently connected rotationally fixed to one another and therefore rotate permanently together. The rotationally fixed connection in each case is formed by an interposed shaft.

As can also be seen in FIG. 2, the third element E33 of the third planetary gearset P3 is permanently immobilized and thus permanently prevented from rotating. In this case the rotationally fixed structural element 12 is preferably a transmission housing of the electric vehicle transmission 7, part of such a transmission housing, or a component connected rotationally fixed thereto. The second element E23 of the third planetary gearset P3, in contrast, is connected rotationally fixed to the drive output shaft 11 of the electric vehicle transmission 7, whereby the said second element E23 rotates permanently together with the drive output shaft 11. Indeed, the second element E23 of the third planetary gearset P3 can be made integrally with the drive output shaft 11.

Besides the second element E23 of the third planetary gearset P3, the drive output shaft 11 is also permanently connected rotationally fixed to a differential cage 13 of a differential gear system 14. This differential 14 is in the form of a bevel gear differential which, in a manner whose principle is familiar to those with knowledge of the subject, distributes a drive power transmitted by the drive output shaft 11 into the differential cage 13 to drive output shafts 15 and 16 of the driven axle 3. Respective drive wheels 17 and 18 of the driven axle 3 are drivingly connected to the drive output shafts 15 and 16.

In the electric vehicle transmission 7 there are additionally provided two shifting devices 19 and 20, by means of which in each case various couplings can be formed with interlock. In this case the shifting devices 19 and 20 are in the form of unsynchronized shifting devices. By way of the shifting device 19 the functions of two shifting element A and B are brought about, which are indicated in FIGS. 2 to 4. The shifting device 19 comprises a coupling element 21 which is designed in the manner of a shifting sleeve and is guided rotationally fixed and axially displaceably on guide teeth 22 of a tooth array 23. The said tooth array 23 is connected rotationally fixed to the second element 22 of the second planetary gearset P2. Furthermore, the coupling element 21 is provided with first meshing teeth 24 and second meshing teeth 25 and can be moved axially by an associated actuating actuator 26 to two different shift position and a neutral position. The actuating actuator 26 is preferably an electro-mechanical actuator.

In a first shift position, which is shown in FIG. 2, the coupling element 21 of the shifting device 19 engages with its meshing teeth 25 in a tooth array 27 which is connected rotationally fixed to the rotationally fixed structural element 12. In that way, the function of an actuated condition of the shifting element A is obtained, in which the second element E22 of the second planetary gearset P2 is fixed onto the rotationally fixed structural element 12 and thus prevented from rotating.

In addition, the coupling element 21 of the shifting device 19 can be moved by the actuating actuator 26 to a second shift position in which the engagement between the meshing teeth 25 and the tooth array 27 is released and instead, the meshing teeth 24 engage with a tooth array 28. Consequently, by way of the coupling element 21, the second element E22 of the second planetary gearset P2 is connected rotationally fixed to the first element E21 of the second planetary gearset P2 and to the third element E31 of the first planetary gearset P1, which results in blocking of the second planetary gearset P2, owing to the rotationally fixed connection between the first element E12 and the second element E22 of the second planetary gearset P2. This second shift position of the coupling element 21 corresponds to the function of an actuated condition of the shifting element B and is shown in FIG. 4.

In the shifting device 20 a coupling element 29 is also provided, which is guided on guide teeth 30, rotationally fixed and axially displaceably, on a tooth array 31. The tooth array 31 is in this case connected rotationally fixed to the third element E32 of the second planetary gearset P2. By means of the shifting device 20 the function of two shifting elements C and D are brought about, which are also indicated in FIGS. 2 to 4.

In this case, by way of an associated actuating actuator 32, besides a neutral position in which the third element E32 of the second planetary gearset P2 is decoupled, the coupling element 29 can on the one hand be moved axially to a first shift position in which the coupling element 29 engages with meshing teeth 33 in a tooth array 34. The tooth array 34 is connected rotationally fixed with the second element E21 of the first planetary gearset P1 and the first element E13 of the third planetary gearset P3. Consequently, the third element E32 of the second planetary gearset P2 is connected rotationally fixed by the coupling element 29 to the second element E21 of the first planetary gearset P1 and the first element E13 of the third planetary gearset P3. This corresponds to the function of an actuated condition of the shifting element C and is shown in FIG. 2.

On the other hand, the coupling element 29 can be moved by the actuating actuator 32 to a second shift position, in which the meshing teeth 33 engage with a tooth array 35. In this case the tooth array 35 is connected rotationally fixed to the drive output shaft 11, so that in the second shift position of the coupling element 29 the third element E32 of the second planetary gearset P2 is connected rotationally fixed to the drive output shaft 11. This corresponds functionally to an actuated condition of the shifting element D, as shown in FIGS. 3 and 4.

In the present case the drive system 4 is arranged parallel to the driven axle 3 and is axially arranged between the drive wheels 17 and 18. Here, the electric machine 6 is arranged axially close to the drive wheel 18, whereas the first planetary gearset P1 of the electric vehicle transmission 7 is positioned axially at the level of, and radially inside the stator 8 of the electric machine 6. Axially after the first planetary gearset P1, then follows first the second planetary gearset P2 and the further planetary gearset P3 as well as the differential gear system 17, in such manner that the latter, together with the planetary gearsets P1 to P3, can be accommodated in a transmission housing of the electric vehicle transmission 7. While the shifting device 19 is positioned axially between the first planetary gearset P1 and the second planetary gearset P2, the shifting device 20 is axially at the level of the second planetary gearset P2 and axially between the second planetary gearset P2 and the third planetary gearset P3.

Figure 5:
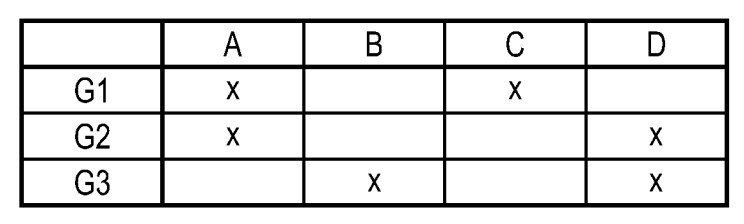

Furthermore, FIG. 5 shows an example shifting scheme of the electric vehicle transmission 7 shown in FIGS. 2 to 4. From this it can be seen that in the electric vehicle transmission 7 a first gear G1, a second gear G2 and a third gear G3 can be engaged, and in the table of FIG. 5 in each case an X indicates which of the shifting elements A, B, C, and D contained in the shifting devices 19 and 20 are to be actuated. As described earlier, to obtain an actuated condition of the respective shifting element A or B or C or D, the coupling element 21 or 29 is moved to the associated shift position.

The first gear G1 between the drive input shaft 10 and the drive output shaft 11 is obtained by the simultaneous actuation of the shifting element A and the shifting element C, for which the coupling elements 21 and 29 of the shifting devices 19 and 20 are moved to the shift positions shown in FIG. 2. Accordingly, in this case the second element E22 of the planetary gearset P2 is fixed by the coupling element 21 onto the rotationally fixed structural element 12, whereas the coupling element 29 of the shifting device 20 connects the third element E32 of the second planetary gearset P2 rotationally fixed to the first element E13 of the third planetary gearset P3 and the second element E21 of the first planetary gearset P1.

On the other hand, to engage the second gear G2 the functions of the shifting element A and the shifting element D must be actuated, whereby, besides the fixed condition of the second element E22 of the second planetary gearset P2, the third element E32 of the second planetary gearset P2 is connected rotationally fixed to the drive output shaft 11. This shift condition of the electric vehicle transmission 7 is shown in FIG. 3. Accordingly, to shift from the first gear G1 to the second gear G2 the coupling element 29 of the shifting device 20 must be moved from the first shift position (actuated condition of the shifting element C) to the second shift position (actuated condition of the shifting element D).

Finally, the third gear G3 of the electric vehicle transmission 7 is engaged by functionally actuating the shifting elements B and D. Correspondingly, in the shifting device 19 the coupling element 21 has to be moved to that shift position in which the meshing teeth 24 engage with the tooth array 28, whereas as is already the case in gear G2, in the shifting device 20 the coupling element 29 on the meshing teeth 33 engages with the tooth array 35. In that way the second element E22 of the second planetary gearset P2 is connected rotationally fixed to the first element E12 of the second planetary gearset P2 so that the second planetary gearset P2 is blocked, and in addition the third element E32 of the second planetary gearset P2 is connected rotationally fixed to the drive output shaft 11. This is shown in FIG. 4. To shift out of the second gear G2 to the third gear G3, the coupling element 21 of the shifting device 19 has to be changed from one shift position (actuated condition of the shifting element A) to the other shift position (actuated condition of the shifting element B), while the coupling element 29 of the shifting device 20 remains in the same position as in gear G2.

Figure 6:
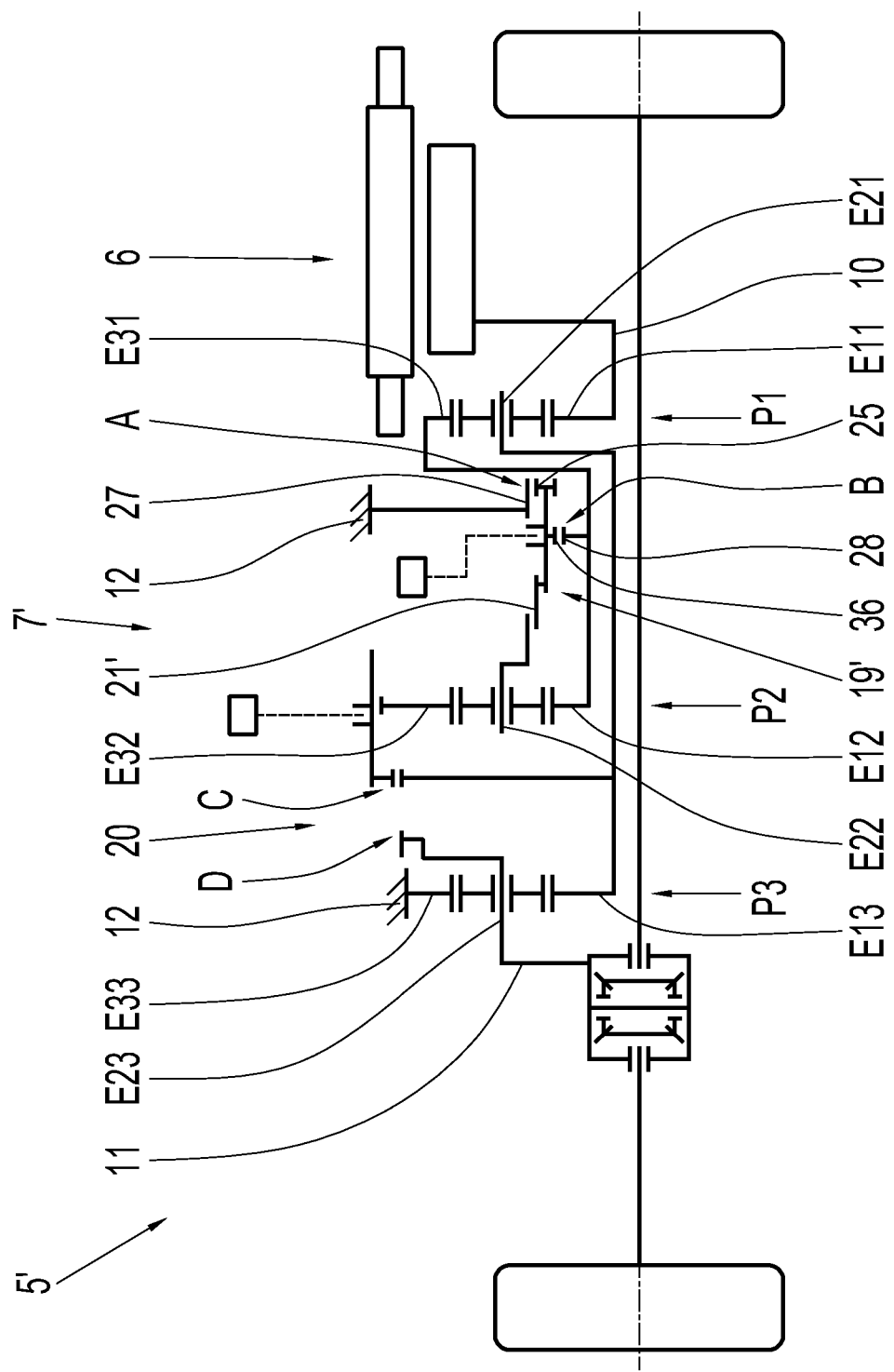
FIG. 6: A schematic view of a drive-train according to a second design option of the invention.

FIG. 6 shows a schematic view of a vehicle drive-train 5' which can also be used in the electric vehicle 1 of FIG. 1 and which is in this case designed in accordance with a second embodiment of the invention. This embodiment corresponds very largely to the variant according to FIGS. 2 to 5, with the difference that in an electric vehicle transmission 7' of the vehicle drive-train 5' a shifting device 19' is now provided, whose coupling element 21', compared with the variant according to FIGS. 2 to 5, is equipped with additional meshing teeth 36. Besides its neutral position and its two shift positions, the coupling element 21' can also be moved to a further shift position which is shown in FIG. 6 and in which the coupling element 21' engages simultaneously with its meshing teeth 25 with the tooth array 27 and with its meshing teeth 36 with the tooth array 28. Thus, in functional terms this results in a simultaneous actuation of the shifting elements A and B and blocks the second planetary gearset P2 while at the same time the second element E22 of the second planetary gearset P2 is fixed to the rotationally fixed structural element 12. Consequently, the second planetary gearset P2 is also blocked and with it the electric vehicle transmission 7' as a whole, whereby the function of a parking lock is realized. In other respects, the embodiment according to FIG. 6 corresponds to the variant in FIGS. 2 to 5, so reference should be made to the description thereof.

Figure 7:
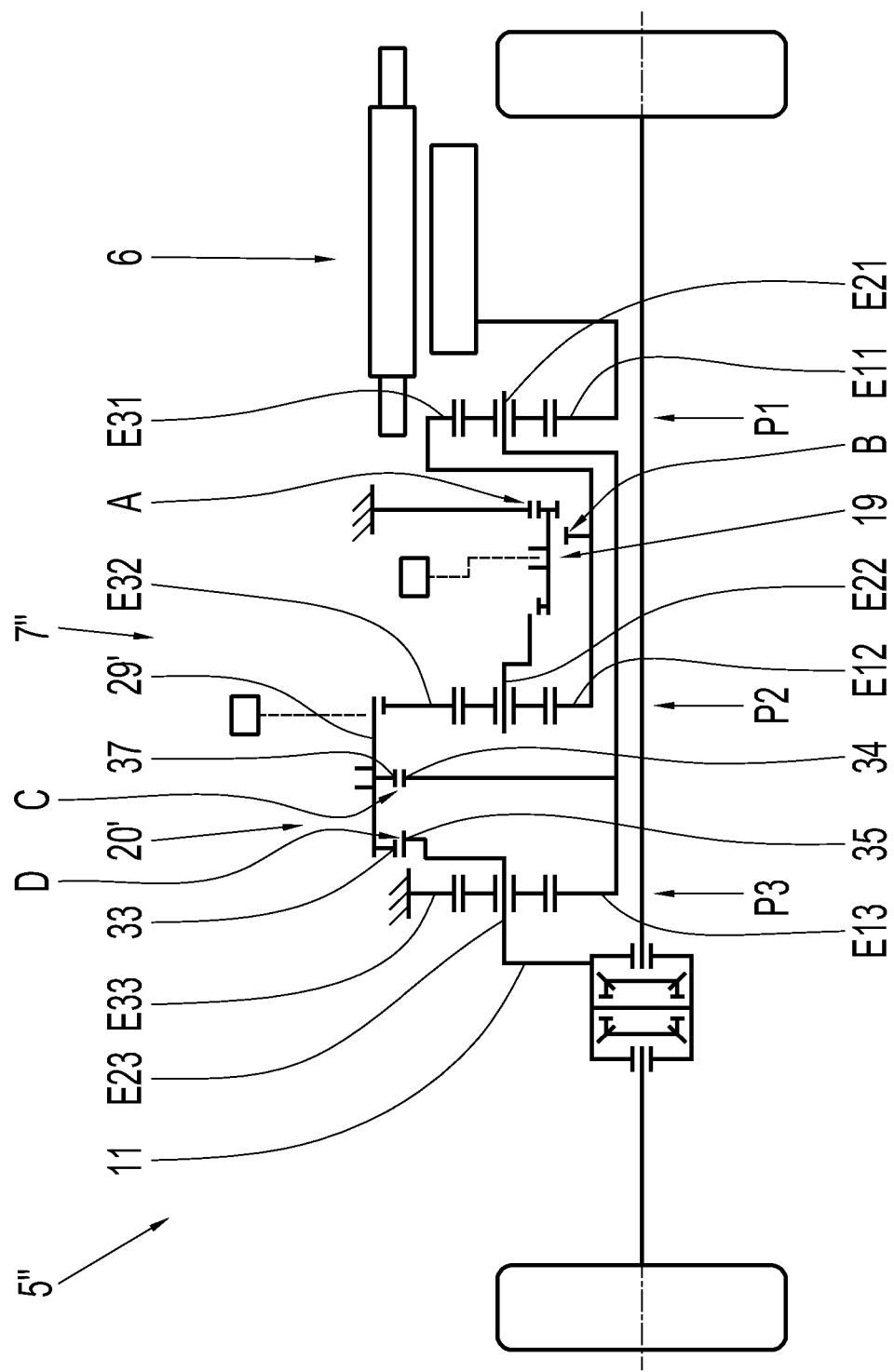
FIG. 7: A schematic view of a drive-train according to a third embodiment of the invention.

Finally, FIG. 7 shows a schematic representation of a vehicle drive-train 5" according to a third possible design of the invention, such that this vehicle drive-train 5" too can be used in the electric vehicle 1 according to FIG. 1. In this case the vehicle drive-train 5" also corresponds essentially to the variant according to FIGS. 2 to 5, the difference now being that in an electric vehicle transmission 7" of the vehicle drive-train 5" a shifting device 20' is equipped with a coupling element 29' which, compared with the variant according to FIGS. 2 to 5, is fitted with additional meshing teeth 37. Furthermore, apart from the neutral position and the two shift positions described in relation to FIGS. 2 to 5, the coupling element 29' can be moved axially to a further shift position as shown in FIG. 7. In this shift position the coupling element 29' engages at the same time with its meshing teeth 33 in the tooth array 35 and with its meshing teeth 37 with the tooth array 34, which corresponds functionally to a simultaneous actuation of the shifting elements C and D. Since thereby the second element E23 and the first element E13 of the third planetary gearset P3 are connected rotationally fixed to one another by virtue of the coupling element 29', the third planetary gearset P3 is blocked. Overall, owing to the permanently fixed condition of the third element E33 of the third planetary gearset P3, this also blocks the third planetary gearset P3 and therefore also the electric vehicle transmission 7". In that way too the function of a parking lock can be realized. In other respects, the embodiment according to FIG. 7 corresponds to the variant shown in FIGS. 2 to 5, so that reference should be made to the description thereof.

By virtue of the design of an electric vehicle transmission according to the invention, various gears for the connection of an electric machine can be obtained in an advantageous manner.

Indexes

1 Electric vehicle
2 Vehicle axle
3 Driven axle
4 Drive system
5, 5', 5" Vehicle drive-train
6 Electric machine
7, 7', 7" Electric vehicle transmission
8 Stator
9 Rotor
10 Drive input shaft
11 Drive output shaft
12 Rotationally fixed structural element
13 Differential cage
14 Differential gear system
15 Drive output shaft
16 Drive output shaft
17 Drive wheel
18 Drive wheel
19, 19' Shifting device
20 Shifting device
21, 21' Coupling element
22 Guide teeth
23 Tooth array 24 Meshing teeth
25 Meshing teeth
26 Actuating actuator
27 Tooth array
28 Tooth array
29 Coupling element
30 Guide teeth
31 Tooth array
32 Actuating actuator
33 Meshing teeth
34 Tooth array
35 Tooth array
36 Meshing teeth
37 Meshing teeth
P1 First planetary gearset
P2 Second planetary gearset
P3 Third planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
E13 First element of the third planetary gearset
E23 Second element of the third planetary gearset
E33 Third element of the third planetary gearset
A Shifting element
B Shifting element
C Shifting element
D Shifting element
G1 First gear
G2 Second gear
G3 Third gear

The invention claimed is:

1. An electric vehicle transmission comprising:
a drive input shaft configured to be coupled to an electric machine;
a drive output shaft;
a first planetary gearset
a second planetary gearset; and
a third planetary gearset;
wherein:
the first planetary gearset, the second planetary gearset and the third planetary gearset each comprise a first element, a second element and a third element, in the form of a sun gear, a planetary web, and a ring gear respectively, wherein at least in functional terms a first shifting element, a second shifting element and a third shifting element are provided;
the first element of the first planetary gearset is connected rotationally fixed to the drive input shaft;
the second element of the first planetary gearset and the first element of the third planetary gearset are connected rotationally fixed to one another
the third element of the first planetary gearset and the first element of the second planetary gearset are connected rotationally fixed to one another;
the third element of the third planetary gearset is immobilized;
the second element of the third planetary gearset is connected rotationally fixed to the drive output shaft;
the second element of the third planetary gearset is connected rotationally fixed to the drive output shaft;
the second element of the second planetary gearset can be immobilized by the first shifting element;
two of the elements of the second planetary gearset can be brought into rotationally fixed connection with one another by means of the second shifting element;
the third element of the second planetary gearset can be connected rotationally fixed by the third shifting element to the first element of the third planetary gearset and to the second element of the first planetary gearset; and
by means of an at least functionally effective fourth shifting element the said third element of the second planetary gearset can be brought into rotationally fixed connection with the drive output shaft.

2. The electric vehicle transmission according to claim 1, comprising:
a first gear between the drive input shaft and the drive output shaft, the first gear obtained by closing the first shifting element and the third shifting element;
a second gear between the drive input shaft and the drive output shaft, the second gear obtained by actuating the first shifting element and the fourth shifting element; and
a third gear between the drive input shaft and the drive output shaft, the third gear obtained by closing the second shifting element and the fourth shifting element.

3. The electric vehicle transmission according to claim 1, wherein a function of a parking lock is obtained by the simultaneous actuation of the first shifting element and the second shifting element.

4. The electric vehicle transmission according to claim 3 wherein the coupling element of the shifting device is further configured to be moved to a third position in which the coupling element functionally brings about a simultaneous actuation of the first shifting element and the second shifting element, in that the second element of the second planetary gearset is fixed by the coupling element and is at the same time connected rotationally fixed to the first element or to the third element of the second planetary gearset.

5. The electric vehicle transmission according to claim 1, wherein a function of a parking lock is obtained by the simultaneous actuation of the third shifting element and the fourth shifting element.

6. The electric vehicle transmission according to claim 1, wherein the shifting elements are in the form of interlocking shifting elements.

7. The electric vehicle transmission according to claim 6, wherein the first shifting element and the second shifting element are formed by a shifting device having a coupling element configured to be positioned in a first shift position and in a second shift position, wherein in the first shift position the coupling element functionally brings about an actuated condition of the first shifting element and fixes the second element of the second planetary gearset, and wherein in the second shift position the coupling element functionally brings about an actuated condition of the second shifting element and connects the second element of the second planetary gearset rotationally fixed to the first element or to the third element of the second planetary gearset.

8. The electric vehicle transmission according to claim 6, wherein the third shifting element and the fourth shifting element are formed by a shifting device having a coupling element configured to be positioned in a first shift position and in a second shift position, wherein, in its first shift position the coupling element functionally brings about an actuated condition of the third shifting element and connects the third element of the second planetary gearset rotationally fixed to the first element of the third planetary gearset and the second element of the first planetary gearset, and wherein in its second shift position the coupling element functionally brings about an actuated condition of the fourth shifting element and connects the third element of the second planetary gearset rotationally fixed to the drive output shaft.

9. The electric vehicle transmission according to claim 8, wherein the coupling element of the shifting device is further configured to be moved to a third shift position in which the coupling element functionally beings about a simultaneous actuated condition of the third shifting element and of the fourth shifting element, in that the third element of the second planetary gearset is at the same time connected to the first element of the third planetary gearset and the second element of the first planetary gearset and is connected rotationally fixed to the drive output shaft.

10. The electric vehicle transmission according to claim 6, wherein the shifting elements are in the form of unsynchronized claw-type shifting elements.

11. The electric vehicle transmission according to claim 1, wherein the drive output shaft is coupled to a differential gear system.

12. The electric vehicle transmission according to claim 1, wherein the planetary gearsets are arranged at a connection point of the drive input shaft that serves for the coupling of the drive input shaft to the electric machine, in a sequence of the first planetary gearset, the second planetary gearset, and the third planetary gearset.

13. The electric vehicle transmission according to claim 12, wherein the first shifting element and the second shifting element are positioned axially between the first planetary gearset and the second planetary gearset, and the third shifting element and the fourth shifting element are positioned axially between the second planetary gearset and the third planetary gearset.

14. A drive system for an electric vehicle, comprising:
an electric machine and an electric vehicle transmission according to claim 1, wherein the electric machine includes a rotor, the rotor of the electric machine coupled to the drive input shaft of the electric vehicle transmission.

15. The drive system according to claim 14, wherein the first planetary gearset of the electric vehicle transmission is arranged axially overlapping and radially inside the electric machine.

16. A vehicle drive-train comprising a drive system according to claim 14.

17. The vehicle drive-train according to claim 16, wherein the drive system is arranged parallel to a drive axle, and the drive output shaft of the electric vehicle transmission is coupled to drive output shafts of the drive axle.

18. An electric vehicle, comprising a vehicle drive-train according to claim 17.

\* \* \* \* \*